Jan. 24, 1950 W. O. LUM 2,495,272
INVERSE AUTOMATIC FLOW REGULATING VALVE SYSTEM
Filed July 17, 1947
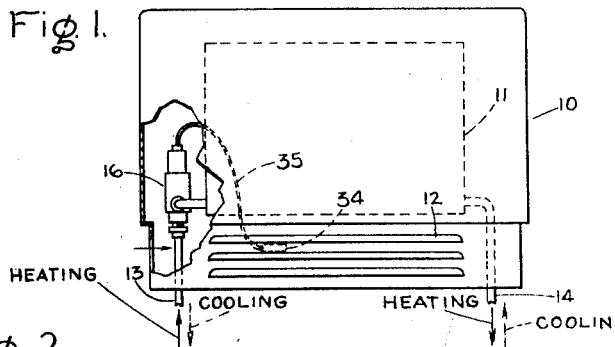
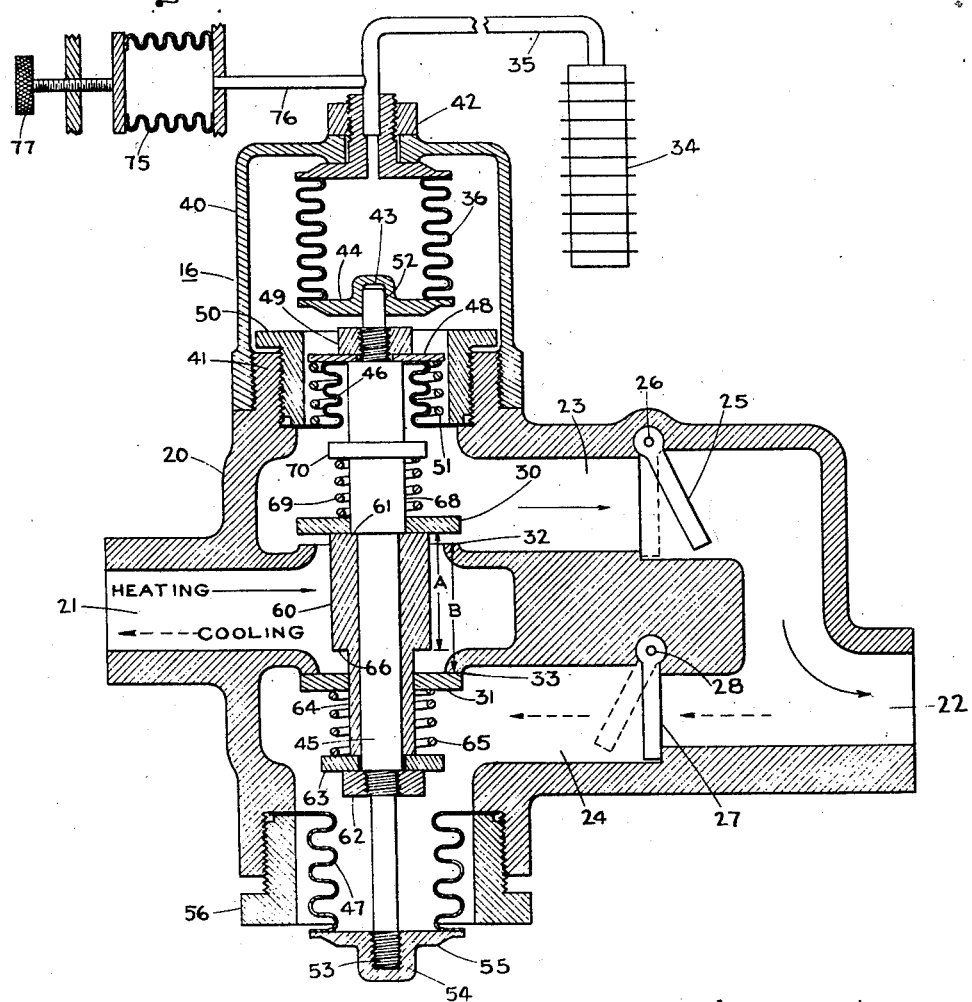
Inventor:
Walter O. Lum,
by Edwin L. Rich
His Attorney.

Patented Jan. 24, 1950

2,495,272

UNITED STATES PATENT OFFICE 2,495,272

INVERSE AUTOMATIC FLOW REGULATING VALVE SYSTEM

Walter O. Lum, Livingston, N. J., assignor to General Electric Company, a corporation of New York Application July 17, 1947, Serial No. 761,675

8 Claims. (Cl. 236—1)

The invention relates to inverse condition responsive flow regulating valve systems, particularly inverse thermostatic heating and cooling flow regulating valve systems of the flow reversal type such as disclosed and claimed in the Knaus application, Serial Number 747,760, filed May 13, 1947 and assigned to the present assignee.

The principal object is to provide a pair of jointly closed inverse condition responsive flow control valves for selectively controlling parallel flow paths in a circulation system inversely or oppositely in response to like variations of a predetermined condition in different ranges.

Another object is to combine a pair of flow control valves inversely or oppositely operable in response to like variations of a predetermined condition with a pair of reversed check valves in parallel flow paths provided in a reverse circulation system so as to insure inversion of the automatic condition responsive flow control upon reversal of the flow in the system.

Another object is to enable a pair of inverse flow control valves operated by thermostatic means and interconnected with a reversed pair of check valves to provide selective inverse thermostatic flow control upon the flow of heating and cooling medium in opposite directions in a reverse heat exchange system.

A more specific object is to provide a pair of opposite flow modulation valves each biased closed and selectively operable by a single temperature responsive operator so that each opens after the other closes upon corresponding temperature change to regulate the flow in parallel branches of a reverse flow circulating system for heating and cooling medium with a corresponding one of a pair of reversed check valves in each branch for selectively rendering the thermostatically operated valve therein effective or ineffective to modulate the flow dependent upon the direction of flow in the system. Thus with the flow of heating medium in one direction, one of the modulation valves is rendered effective to increase the flow of heating medium while with flow of cooling medium in the opposite direction the other modulation valve is rendered effective to decrease the opposite flow of cooling medium, each in response to like change in the temperature to which the thermostatic operator is responsive.

Futher objects and advantages of the invention will appear in the following description of the accompanying drawing in which Fig. 1 is a schematic view partly in section of a reverse flow room heating and cooling unit under the control of an inverse thermostatic heating and cooling modulation valve mechanism embodying the improvements of the present invention and Fig. 2 is a sectional view showing the details of construction of the improved inverse thermostatic flow modulation valve mechanism.

As schematically shown in Fig. 1, the year around room air conditioning unit 10 is provided with a heat exchanger 11, preferably of the fin tube type over which the air of the room is passed through the grill openings 12 to both heat and cool the room. Heat exchange medium is circulated to the heat exchanger 11 through pipe connections 13 and 14 with the heating medium circulation in the direction indicated by the full line arrows and the cooling medium circulation in the opposite direction as indicated by the dash line arrows. The flow of both heating and cooling medium is regulated by the improved selective inverse thermostatic flow regulating valve mechanism indicated generally by the reference character 16 and embodying the improvements of the present invention so that the valve mechanism will increase the flow of heating medium but decrease the flow of cooling medium in response to a decrease in room temperature and vice-versa.

As shown in Fig. 2 the improved valve mechanism 16 includes a valve body 20 providing the flow passages 21 and 22 interconnected in communication by the parallel flow paths or branches 23 and 24. A check valve 25 is pivotally supported on the pin 26 so as to open the path or branch 23 only upon flow in the direction indicated by the full line arrow and the check valve 27 is pivotally supported upon the pin 28 so as to open the path or branch 24 only upon flow in the opposite direction indicated by the dotted line arrows. The reversed check valves 25 and 27 need not be included within the valve housing 20, but if desired, may be located in separate pipe lines that are suitably connected to the parallel flow paths 23 and 24.

The inverse pair of flow control valves 30 and 31 are arranged so as jointly and simultaneously to engage with their respective valve seats 32 and 33 formed in the valve body 20 in opposing alignment. These inverse flow control valves 30 and 31 are selectively operated from their closed positions by thermostatic means shown in the form of the temperature responsive bulb 34 interconnected by tube 35 with expansible bellows 36 to provide inverse thermostatic flow modulation in the parallel flow paths 23 and 24. The valve operating bellows 36 is mounted inside a housing 40 that engages with the outer threads on the annular flange 41 extending from the valve body 20. Bellows 36 is secured to the housing 40 by means of the clamping nut 42 with the socket 43 formed in the plate 44 sealing the free end of bellows 36 in engagement with the upper end of the valve operating stem 45.

The valve stem 45 is movably mounted in the valve body 20 by means of two sealing bellows 46 and 47. One end of the sealing bellows 46 is joined to the plate 48 that is sealed to the end 52 of the valve stem 45 by means of the clamping nut 49. The other end of bellows 46 is sealed to the valve body 20 by means of the annular clamping nut 50 with the spring 51 interposed between the plate 48 and the other end of the sealing bellows 46 so as to tend to expand the bellows and thereby maintain the upper end 52 of the valve stem 45 firmly seated in the socket 43. The lower end 53 of the valve stem 45 is threaded into the socket 54 formed in the cap 55 that closes the lower end of the sealing bellows 47. The upper end of bellows 47 is clamped in sealing engagement with the valve body 20 by means of the annular clamping nut 56.

The valve stem 45 carries a valve operated sleeve 60 that is held against the shoulder 61 by means of the nut 62 and washer 63 with the valve member 31 slidably mounted on the reduced section 64 and biased into engagement with seat 33 by means of the spring 65 interposed between the washer 63 and the valve 31. Thus valve 31 is disengaged from seat 33 only when the shoulder 66 engages with the valve 31. The valve 30 is slidably mounted on the enlarged section 68 of the valve stem 45 and is biased into engagement with the upper end of the valve operating sleeve 60 by means of the biasing spring 69 interposed between the valve 30 and the collar 70 fixedly secured to the enlarged section 68.

In order to provide for selective operation of the control valves 30 and 31 in separate temperature ranges, the distance A between the shoulder 66 and the upper end of the valve operating sleeve 60 is made less than the distance B between the opposing valve seats 32 and 33. Thus each of the control valves 30 and 31 is closed before the other valve is opened so as to differentiate the temperature ranges in which each of the control valves 30 and 31 is operated. A liquid filled calibrating bellows 75 is connected by tube 76 in communication with the operating bellows 36. Thus upon variation of the volume of the calibrating bellows 75 by means of the manual adjusting screw 77, the amount of expansion of the operating bellows 36 at any temperature of bulb 34 may be varied so as to correspondingly vary the temperature ranges in which each of the control valves 30 and 31 are operated.

Operation

With heating medium circulating to the heat exchanger 11 in the direction indicated by the solid line arrows, the flow between the passages 21 and 22 is in the direction to open the check valve 25 and thereby permit flow through the flow path 23 but to close check valve 27 and thereby block flow through the flow path 24. Under these conditions bulb 34 responds to the temperature variations of the room air so as to correspondingly expand or contract bellows 36 dependent upon the adjustment of the calibrating bellows 75. Thus when the room air temperature decreases, bulb 34 will respond to contract the operating bellows 36 and thereby move flow control valve 30 farther away from seat 32 so as to increase the flow of heating medium to the heat exchanger 11. Conversely, when the room air temperature increases, bulb 34 will respond to expand the operating bellows 36 and thereby move the flow control valve 30 towards the seat 32. In this way, the amount of opening of the flow control valve 30 is modulated so as to correspondingly modulate the flow of heating medium to the heat exchanger 11 and thereby balance the heating demands of the room.

In case of some abnormal condition occurring during circulation of the heating medium such that the room air becomes heated to an abnormally high temperature, the bulb 34 may respond to expand operating bellows 36 sufficiently to engage the shoulder 66 of the valve operating sleeve 60 with the control valve 31 and thereby move valve 31 away from seat 33. However, under such abnormal conditions, the check valve 27 serves effectively to block flow through the flow path 24 and thus prevents the supply of any heating medium to the heat exchanger 11 that might further increase the temperature of the room air. In this way the check valve 27 insures against run-away conditions occurring during heating operation.

Whenever cooling of the room is required, cooling medium is circulated in the opposite direction through the heat exchanger 11 as indicated by the dash arrows. In this case the direction of flow between the passages 21 and 22 is such as to open check valve 27 and close check valve 25 thereby effectively blocking flow through the flow passage 23. Therefore, flow control valve 30 is rendered ineffective and control valve 31 in rendered effective to modulate the flow of the cooling medium.

When the room air temperature increases, bulb 34 will respond to expand bellows 36 and thereby operate the shoulder 66 of the valve operating sleeve 60 into engagement with control valve 31 and thus disengage valve 31 from seat 33. Thereafter the amount of opening of valve 31 corresponds with the degree of increase in the room temperature so as to vary the supply of cooling medium to the heat exchanger 11 to balance the cooling load of the room and is dependent upon the adjustment of the calibrating bellows 75. Thus by operating the manual adjusting screw 77 the room temperature during cooling operation may be varied as desired.

If during cooling operation some abnormal condition should occur such that the room air temperature decreases below the value at which control valve 31 is closed and control valve 30 is opened, the check valve 25 effectively prevents the flow of cooling medium to the heat exchanger 11 thus insuring against run-away conditions.

While the pair of inverse flow control valves 30 and 31 have been shown housed in a single valve casing to be operated by a single temperature responsive device, still if desired the pair of inverse flow control valves may be structurally separated and each provided with a separately adjustable temperature responsive operating device as disclosed and claimed in the Berry application Serial No. 761,704 filed concurrently herewith.

What I claim as new and desire to secure by Letters Patent of the United States is:

1. A reverse fluid circulation control having in combination conduit means providing fluid flow openings for connecting said control in a fluid circuit and a pair of flow paths extending in parallel between said openings for circulation of fluid through said control, a pair of fluid flow control valves each arranged in a respective one of said flow passages, means responsive to variations of a predetermined condition for actuating said flow control valves inversely in response to like changes in said condition to control the rate of flow of fluid in each of said paths, and a pair of check valves operable in opposite directions of fluid flow each associated with one of said flow control valves for preventing fluid flow between said openings in one direction through one of said paths and in the opposite direction through the other of said paths whereby said flow control valves are alternatively rendered effective to control the flow of fluid between said openings.

2. A reverse fluid circulation control having in combination flow control means including a pair of valves with means for inversely operating said valves in response to like variations of a predetermined condition, means providing openings for connecting said control in a fluid circuit, a pair of check valves operable in opposite directions of fluid flow, and conduit means for connecting one of said control valves and one of said check valves in one path between said openings and the other control valve and check valve in a parallel path therebetween whereby said control valves are rendered alternatively effective on opposite directions of flow of fluid through said control.

3. A reverse circulation control for heating and cooling fluid having in combination conduit means providing fluid flow openings for connecting said control in a fluid circuit and a pair of parallel branches connecting said openings for the flow of fluid therebetween, means including a pair of valves each arranged in a respective one of said branches for controlling the rate of fluid flow between said openings, thermostatic means for opening one of said valves and closing the other of said valves in response to variations in the same sense in two ranges of a variable temperature condition, and a pair of check valves operable in opposite directions of fluid flow each arranged in a corresponding one of said branches for preventing the flow of fluid in one direction therethrough thereby selectively rendering the corresponding thermostatically operated valve effective only upon flow in a corresponding direction.

4. A reverse circulation control for heating and cooling fluid having in combination a pair of fluid flow openings for connecting said control in a fluid circuit, means including a plurality of conduits providing branches extending in parallel between said openings for the flow of fluid therebetween, a pair of flow control valves each arranged in a respective one of said branches to control the rate of flow of fluid therethrough, means responsive to a variable temperature condition for closing one of said valves and opening the other of said valves upon variations in the same sense in two ranges of said condition, a pair of check valves operable in opposite directions of fluid flow each arranged in a respective one of said branches to insure opposite changes in the rate of flow of fluid upon flow of fluid in opposite directions through said control.

5. A fluid circulation control having in combination conduit means providing a pair of fluid flow openings for connecting said control in a single fluid path and a pair of branches extending in parallel between said openings for circulation of fluid therebetween, means for directing fluid flowing through said path in one direction solely through one of said branches and fluid flowing in the opposite direction solely through the other of said branches, a pair of separately operable flow control valves each arranged to control the flow of fluid in a corresponding one of said branches, each of said valves having means for normally biasing the valve to a closed position, and automatic means responsive to a variable condition for separately and progressively opening a corresponding one of said valves in response to variations in opposite directions of said condition.

6. A heating and cooling fluid control having in combination conduit means providing a pair of fluid flow openings for connecting said control in a single fluid path and a pair of branches extending in parallel between said openings for circulation of fluid therebetween, means for directing fluid flowing through said path in one direction solely through one of said branches and fluid flowing in the opposite direction solely through the other of said branches, a pair of separately operable flow control valves each arranged to control the flow of fluid in a corresponding one of said branches, each of said valves having valve closing biasing means, and thermostatic modulation means having connections for progressively opening each of said valves after progressively closing the other in response to progressive temperature change in a corresponding direction.

7. A reverse fluid circulation control having in combination conduit means providing a pair of fluid flow openings for connecting said control in a fluid circuit and a pair of branches extending in parallel between said openings for circulation of fluid therebetween, a pair of separately operable flow control valves each controlling the flow in a corresponding one of said parallel branches, each of said valves having valve closing biasing means, thermostatic modulating means having connections for progressively opening each of said valves after progressively closing the other in response to progressive temperature change in a corresponding direction, and a pair of reversed check valves each controlling the flow in a corresponding one of said branches to render the thermostatic flow modulation therein dependent upon the direction of flow.

8. A selective inverse automatic flow regulating valve having in combination a valve casing providing a pair of parallel flow paths interconnecting through flow passages with opposite valve seats formed in said valve casing at the junction of said paths with one of said passages, a valve stem movably mounted in said casing and extending centrally through the openings formed by said valve seats, a bellows operatively engaging one end of said valve stem and having temperature responsive bulb means for expanding and contracting said bellows, a pair of opposing valvular members each mounted on said valve stem for relative movement with respect thereto and each having biasing spring means for biasing the valvular member into engagement with the corresponding one of said opposite seats, a selective valve operating member mounted on said valve stem between said valvular member for movement into separate engagement therewith and a pair of reverse check valves each mounted in a corresponding one of said paths to render the thermostatic flow modulation valve therein effective and ineffective dependent upon the direction of flow.

WALTER O. LUM.

REFERENCES CITED

The following references are of record in the file of this patent:

UNITED STATES PATENTS

| Number | Name | Date |
|---|---|---|
| Re. 22,685 | Carrier | Oct. 30, 1945 |
| 2,302,987 | Walsh | Nov. 24, 1942 |
| 2,429,739 | Arnhym | Oct. 28, 1947 |
| 2,470,503 | Levine | May 17, 1949 |

FOREIGN PATENTS

| Number | Country | Date |
|---|---|---|
| 594,280 | Germany | Apr. 6, 1934 |